US008767128B2

(12) United States Patent
Suzuki

(10) Patent No.: US 8,767,128 B2
(45) Date of Patent: Jul. 1, 2014

(54) IMAGE DISPLAY DEVICE AND METHOD FOR ADJUSTING CORRECTION DATA IN LOOK-UP TABLE

(75) Inventor: Masahiro Suzuki, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 52 days.

(21) Appl. No.: 13/353,656

(22) Filed: Jan. 19, 2012

(65) Prior Publication Data

US 2012/0188265 A1 Jul. 26, 2012

(30) Foreign Application Priority Data

Jan. 25, 2011 (JP) ................................ 2011-013348

(51) Int. Cl.
*H04N 9/73* (2006.01)
*G09G 5/06* (2006.01)

(52) U.S. Cl.
CPC .......... *G09G 5/06* (2013.01); *G09G 2320/0693* (2013.01); *G09G 2320/0242* (2013.01); *G09G 2320/0666* (2013.01)
USPC ........... 348/655; 348/656; 348/807; 348/657; 348/658

(58) Field of Classification Search
USPC ............... 348/655–677; 345/87–89, 690, 601
See application file for complete search history.

(56) References Cited

U.S. PATENT DOCUMENTS 6,795,063 B2 9/2004 Endo et al.
7,358,988 B1 * 4/2008 Konishi et al. ............. 348/222.1
2001/0015774 A1 * 8/2001 Endo et al. .................... 348/807

FOREIGN PATENT DOCUMENTS

JP 05-236498 A 9/1993
JP 07-064522 A 3/1995
JP 2001-238227 A 8/2001

* cited by examiner

*Primary Examiner* — Jefferey Harold
*Assistant Examiner* — Samira Monshi
(74) *Attorney, Agent, or Firm* — Morgan, Lewis & Bockius LLP

(57) ABSTRACT

An image display device such as LCD television comprises: LUTs (look-up tables) which are tables of correction data for correcting color balance of a displayed image; gain adjustment units for providing gain to input signal values representing brightness levels of red, green and blue colors in image data of the displayed image; and a microcomputer for recalculating the correction data in the LUTs and updating the correction data to the recalculated ones. The microcomputer determines, as adjustment gain values, gain values which are provided to the input signal values by the gain adjustment units and which bring color balance of a white balance adjustment image to a predetermined color balance, and recalculates the correction data in the LUTs based on the correction data and the adjustment gain values. This image display device can increase accuracy of white balance adjustment and reduce time required for the white balance adjustment.

2 Claims, 5 Drawing Sheets

IMAGE DISPLAY DEVICE AND METHOD FOR ADJUSTING CORRECTION DATA IN LOOK-UP TABLE

BACKGROUND OF THE INVENTION

1. Field of the Invention

The present invention relates to an image display device for displaying a color image on a color display unit and a method for adjusting correction data in a look-up table (which stores correction data for correcting color balance of a color image and will be hereafter referred to as LUT).

2. Description of the Related Art

Image display devices for displaying color images on a color display unit in the prior art include a so-called liquid crystal display (hereafter referred to as LCD) television, which receives a television signal broadcast from a television broadcast station and displays a color image based on the television signal on an LCD panel as a color display unit. The LCD television comprises an LUT which stores correction data for correcting color balance (hue) of an image to be displayed on the LCD panel (so as to achieve predetermined color balance). It is designed that an image based on a television signal is corrected for color balance based on the correction data in the LUT (so as to achieve predetermined color balance), and then is displayed on the LCD panel. More specifically, such an LCD television is designed to use the correction data in the LUT to correct an input signal value representing a brightness level of each color of red, green and blue in image data of the image based on the television signal (i.e. image data generated from the television signal), so as to display a color image based on the corrected input signal value on the LCD panel.

Note that correction data in an LUT is calculated and generated using one LCD television called average product and based on color balance of an image displayed on this LCD television. However, there are individual differences among individual LCD televisions. This causes differences in color balance (hue) among resultant images displayed on individual LCD televisions even if the color balance of an image based on the same image data is corrected in the same way based on the same correction data in the LUT in the individual LCD televisions. This means that a color balance of a displayed color image after corrected based on correction data in an LUT may, in some cases, not be a predetermined color balance due to individual differences among individual LCD televisions.

Thus, an adjustment called white balance adjustment is made in such LCD televisions before shipment in order to eliminate differences in color balance or hue of displayed images due to individual differences among individual LCD televisions, or more specifically to bring a color balance of a displayed color image to a predetermined color balance when the color balance of the displayed image after corrected based on correction data in an LUT is not the predetermined color balance due to the individual differences among the individual LCD televisions. A conventional LCD television is designed such that a gain and an offset are provided to an input signal value representing a brightness level of each color of red, green and blue in given image data (image data generated from a television signal), and each input signal value provided with the gain and the offset is corrected based on correction data in an LUT so as to display a color image on an LCD panel based on each corrected input signal value, and that the white balance adjustment is made (i.e. color balance of the displayed image is brought to a predetermined color balance) by adjusting the gain value and the offset value provided to the input signal value.

The conventional LCD television comprises a gain adjustment unit for providing gain to an input signal value and an offset adjustment unit for providing offset to the input signal value. The white balance is adjusted by adjusting a gain value of the gain adjustment unit (more specifically, a gain value provided to the input signal value) and adjusting an offset value of the offset adjustment unit (more specifically, an offset value provided to the input signal value) without replacing the LUT by another or updating the correction data of the LUT. This white balance adjustment is made by displaying a predetermined white balance adjustment image (white color or neutral color image with a predetermined brightness level) on the LCD panel, and by adjusting the gain value of the gain adjustment unit and the offset value of the offset adjustment unit so as to bring the color balance of the displayed white balance adjustment image to a predetermined color balance.

More specifically, image data of a white balance adjustment image is provided to the LCD television from a white balance adjustment image supply device as an external device, so as to provide a gain and an offset (gain of 1 and offset of 0 in an initial state) to an adjustment input value (input value used for adjustment) which is an input signal value representing a brightness level of each color of red, green and blue in the image data of the white balance adjustment image provided to the LCD television. The adjustment input value provided with the gain and the offset is corrected based on the correction data in the LUT, and the white balance adjustment image based on the thus corrected adjustment input value is displayed on the LCD panel. The color balance of the white balance adjustment image displayed on the LCD panel is measured by a measuring device as an external device. The gain value of the gain adjustment unit and the offset value of the offset adjustment unit are adjusted so as to allow the measured color balance value to be in a predetermined range, i.e. bring the color balance of the white balance adjustment image displayed on the LCD panel to a predetermined color balance.

Even more specifically, as the white balance adjustment image, two white balance adjustment images with different brightness levels (the white balance adjustment image with a lower brightness level being hereafter referred to as Low side white balance adjustment image, and the white balance adjustment image with a higher brightness level being hereafter referred to as High side white balance adjustment image) are displayed on the LCD panel. The gain value of the gain adjustment unit is adjusted to bring the color balance of the High side white balance adjustment image to a predetermined color balance, while the offset value of the offset adjustment unit is also adjusted to bring the color balance of the Low side white balance adjustment image to a predetermined color balance. This is done by repeating a process of displaying the High side white balance adjustment image on the LCD panel and adjusting the gain value of the gain adjustment unit, and a process of displaying the Low side white balance adjustment image on the LCD panel and adjusting the offset value of the offset adjustment unit, whereby the gain value of the gain adjustment unit and the offset value of the offset adjustment unit are adjusted so as to bring the color balance of each of the High side white balance adjustment image and the Low side white balance adjustment image to a predetermined color balance. The white balance adjustment is made in this way.

In order to display a color image based on a television signal after the white balance adjustment is made, the thus adjusted gain value and the offset value are used to provide a gain and an offset to the input signal value representing a brightness level of each color of red, green and blue in the image data of the color image to be displayed, and each input signal value provided with the gain and the offset is corrected based on the correction data in the LUT so as to display a color image on the LCD panel based on each corrected input signal value. Here, the gain value and the offset value after adjusted by the white balance adjustment are equally applied to the entire range of the input signal value, so that a gain and an offset based on the thus adjusted gain value and offset value are equally provided to the input signal value representing a brightness level of each color of red, green and blue in the image data of the image to be displayed.

However, the conventional white balance adjustment described above has the following problems. (1) First, as described above, an offset is equally provided to an input signal value representing a brightness level of each color of red, green and blue in image data of an image to be displayed. Thus, when the input signal value is low (particularly when it is lower than the Low side adjustment input value), the color accuracy of the displayed image is lowered (the color balance of the displayed image is caused to shift from the predetermined color balance). For example, when the offset value provided to the input signal value representing the brightness level of red is a positive value, the displayed image is caused to take on reddish color, more than expected, in dark areas (areas of the displayed image with low brightness) including black.

(2) Second, the gain adjustment by displaying the High side white balance adjustment image and the offset adjustment by displaying the Low side white balance adjustment image influence each other. This increases time for the adjustment because it is required to repeat many times the offset adjustment process to bring the color balance of the Low side white balance adjustment image to a predetermined color balance as well as the gain adjustment process to bring the color balance of the High side white balance adjustment image to a predetermined color balance until the color balance of both Low side and High side white balance adjustment images is brought to a standard value (predetermined color balance) (more specifically, until it becomes possible to determine the gain value and the offset value which bring the color balance of both Low side and High side white balance adjustment images to the predetermined color balance).

Thus, according to the conventional white balance adjustment, displayed images have low color accuracy after the white balance adjustment. In other words, the white balance adjustment has low accuracy. Further, it requires a long time for the white balance adjustment. Although the problems of white balance adjustment have been described above using an LCD panel as an example, similar problems can be found in other image display devices for displaying color images on a color display unit such as plasma display panels, CRT (Cathode Ray Tube) display panels and organic EL (Electroluminescence) display panels. The following describes some other technologies of white balance and other adjustments in the prior art.

Japanese Laid-open Patent Publication Hei 5-236498 discloses an automatic white balance adjusting device which sets a reference gain data and a reference DC offset data as an initial value to be used as a reference for white balance adjustment. It detects a gain error between the reference gain data and a bright screen data which is an electrical signal converted from a bright screen determining a gain, and also detects an offset error between the reference DC offset data and a dark screen data which is an electrical signal converted from a dark screen determining a DC offset. The gain and the offset are controlled to null the gain error and the offset error so as to make white balance adjustment.

Japanese Laid-open Patent Publication 2001-238227 discloses a method of tone correction. It measures contrast, and sets a dynamic range of contrast which can be used for display, and further makes gain adjustment and offset adjustment adapted to the dynamic range. Thereafter, it recalculates and writes data in an LUT to achieve full dynamic range, thereby generating tone correction data. Further, Japanese Laid-open Patent Publication Hei 7-64522 discloses an automatic adjusting system for a multi-display device which has multiple display units combined to form a large screen display, and which makes white balance adjustment by allowing a camera to detect amounts of red, green and blue light from the multiple display units. However, such technologies disclosed in the prior art do not solve the above problems.

BRIEF SUMMARY OF THE INVENTION

An object of the present invention is to provide an image display device and a method for adjusting correction data in a look-up table (hereafter referred to as LUT) that are able to increase accuracy of white balance adjustment and to reduce the time required for white balance adjustment.

According to a first aspect of the present invention, this object is achieved by an image display device comprising: a color display unit for displaying a color image; and an LUT which stores correction data for correcting color balance of the color image to be displayed on the color display unit. When a color image based on input image data is displayed on the color display unit, an input signal value representing a brightness level of each color of red, green and blue in the input image data is corrected based on the correction data in the LUT so as to display a color image based on the corrected input signal value on the color display unit. Further, the image display device further comprises: LUT correction data recalculating means for recalculating the correction data in the LUT based on the correction data; and LUT correction data updating means for updating the correction data in the LUT to the correction data recalculated by the LUT correction data recalculating means.

According to a preferred mode of the present invention, the image display device further comprises gain adjusting means for providing gain to an adjustment input value which is an input signal value representing a brightness level of each color of red, green and blue in image data of a white balance adjustment image to be used for recalculating the correction data in the LUT. When the adjustment image is displayed on the color display unit, the gain adjusting means provides a gain to the adjustment input value to generate a gain-modified adjustment input value, and the gain-modified adjustment input value is then corrected based on the correction data in the LUT so as to display a white balance adjustment image based on the corrected gain-modified input value. A gain value, which is provided to the adjustment input value by the gain adjusting means and which brings color balance of the white balance adjustment image displayed on the color display unit to a predetermined color balance, is determined as an adjustment gain value. Further, the LUT correction data recalculating means recalculates the correction data in the LUT based on the correction data and the adjustment gain value.

Preferably, the white balance adjustment image comprises a plurality of different white balance adjustment images, and the LUT correction data recalculating means recalculates the correction data in the LUT based on the correction data and the adjustment gain values for the plurality of white balance adjustment images.

Further preferably, the correction data in the LUT represents a relationship between a pre-correction value representing a pre-correction brightness level of each color of red, green and blue and a post-correction value representing a brightness level to be output after correcting the pre-correction value. The number of the plurality of white balance adjustment images is two. Assuming that x denotes the pre-correction value, y=F(x) denotes the post-correction value before recalculation by the LUT correction data recalculating means, and further y=G(x) denotes the post-correction value after recalculation by the LUT correction data recalculating means, the LUT correction data recalculating means recalculates the post-correction value y=G(x) in the LUT as:

$$y=G(x)=F(\mathrm{Gain}L\times x) \text{ in the range of } x\leq InL;$$

$$y=G(x)=\alpha\times F(\mathrm{Gain}H\times x)+(1-\alpha)\times F(\mathrm{Gain}L\times x) \text{ in the range of } InL<x<InH; \text{ and}$$

$$y=G(x)=F(\mathrm{Gain}H\times x) \text{ in the range of } InH\leq x$$

where InL denotes the adjustment input value in image data of a Low side white balance adjustment image which is one of the two white balance adjustment images with a lower brightness level while InH denotes the adjustment input value in image data of a High side white balance adjustment image which is the other of the two white balance adjustment images with a higher brightness level, and where GainL denotes the adjustment gain value which brings color balance of the Low side white balance adjustment image to a predetermined color balance while GainH denotes the adjustment gain value which brings color balance of the High side white balance adjustment image to a predetermined color balance, and further where $\alpha$ denotes the quotient of (x−GainL)/(GainH−GainL).

According to another preferred mode of the present invention, the image display device further comprises offset adjusting means for providing offset to an adjustment input value which is an input signal value representing a brightness level of each color of red, green and blue in image data of a white balance adjustment image to be used for recalculating the correction data in the LUT. When the adjustment image is displayed on the color display unit, the offset adjusting means provides an offset to the adjustment input value to generate an offset-modified adjustment input value, and the offset-modified adjustment input value is then corrected based on the correction data in the LUT so as to display a white balance adjustment image based on the corrected offset-modified input value. An offset value, which is provided to the adjustment input value by the offset adjusting means and which brings color balance of the white balance adjustment image displayed on the color display unit to a predetermined color balance, is determined as an adjustment offset value. Further, the LUT correction data recalculating means recalculates the correction data in the LUT based on the correction data and the adjustment offset value.

According to a second aspect of the present invention, the object is achieved by a method for adjusting correction data in an LUT (look-up table) which stores correction data for correcting color balance of a color image to be displayed on a color display unit, in which the correction data in the LUT represents a relationship between a pre-correction value representing a pre-correction brightness level of each color of red, green and blue and a post-correction value representing a brightness level to be output after correcting the pre-correction value, the method comprising the steps of: displaying, on the color display unit, a white balance adjustment image to be used for adjusting the correction data in the LUT after using the correction data in the LUT to correct an adjustment input value which is an input signal value representing a brightness level of each color of red, green and blue in image data of the white balance adjustment image; determining, as an adjustment gain value or an adjustment offset value, a gain value or an offset value to bring color balance of the white balance adjustment image displayed on the color display unit to a predetermined color balance after providing a gain or an offset to the adjustment input value and adjusting the gain or the offset so as to bring the color balance of the displayed white balance adjustment image to the predetermined color balance; recalculating the correction data in the LUT based on the correction data and the adjustment gain value or the adjustment offset value; and updating the correction data in the LUT to the recalculated correction data.

According to the first and second aspects of the present invention described above, it is possible in each image display device to appropriately update correction data in the LUT for correcting each input signal value representing a brightness level of each color of red, green and blue in image data of an image to be displayed. Thus, it is possible to correct each input signal value based on the correction data, which has been updated to be appropriate for each image display device, in the LUT over the entire range of the each input signal value representing the brightness level of each color of red, green and blue in the image data of the image to be displayed. This makes it possible to increase color accuracy of the displayed image (i.e. to bring the color balance of the displayed image to a predetermined color balance) after the white balance adjustment is made, thereby increasing accuracy of the white balance adjustment.

Furthermore, according to the present invention, the white balance adjustment is made by recalculating and updating correction data in the LUT, in which the recalculation and updating of the correction data in the LUT can be performed in a short time, thereby making it possible to reduce time required for white balance adjustment. In addition, it is only required to change software in a conventional image display device without need to change the hardware structure of the image display device. Thus, it is possible to achieve the increase in the accuracy of white balance adjustment and reduce the time required for the white balance adjustment without increasing the cost of the image display device.

While the novel features of the present invention are set forth in the appended claims, the present invention will be better understood from the following detailed description taken in conjunction with the drawings.

BRIEF DESCRIPTION OF THE DRAWINGS

The present invention will be described hereinafter with reference to the annexed drawings. It is to be noted that all the drawings are shown for the purpose of illustrating the technical concept of the present invention or embodiments thereof, wherein.

DETAILED DESCRIPTION OF THE INVENTION

Figure 1:
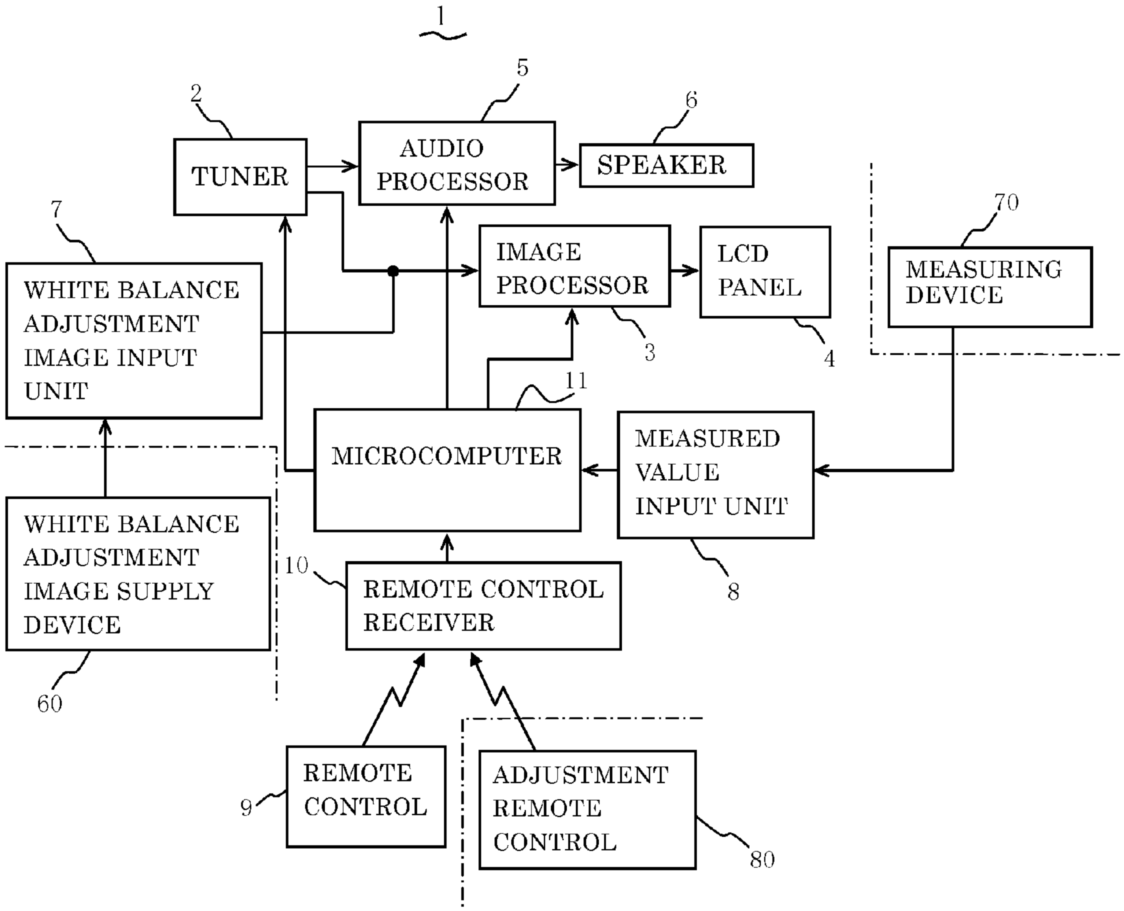
FIG. 1 is a schematic block diagram of an LCD television according to an embodiment of the present invention.

Embodiments of the present invention, as best mode for carrying out the invention, will be described hereinafter with reference to the drawings. The present invention relates to an image display device and a method for adjusting correction data in an LUT (look-up table). It is to be understood that the embodiments described herein are not intended as limiting, or encompassing the entire scope of, the present invention. Note that like parts are designated by like reference numerals, characters or symbols throughout the drawings.

FIG. 1 is a schematic block diagram of an LCD (liquid crystal display) television 1 which is an example of an image display device according to an embodiment of the present invention. The LCD television 1 is a device for receiving a television signal broadcast from a television broadcast station so as to display an image (color image) and output sound based on the television signal. The LCD television 1 comprises an LUT which stores correction data for correcting color balance (hue) of a color image to be displayed on an LCD panel 4 (for correction to achieve predetermined color balance). The LCD television 1 is designed such that the color balance of the image based on a television signal is corrected based on the correction data in the LUT, and then the image is displayed on the LCD panel 4.

The LCD television 1 has a function to make white balance adjustment, which is to eliminate differences in color balance or hue of the displayed image due to individual differences among individual LCD televisions (among individual LCD panels), or more specifically to bring color balance of the displayed image to a predetermined color balance when the color balance of the displayed image after corrected based on correction data in an LUT is not a predetermined color balance due to the individual differences among the individual LCD televisions. According to the present embodiment, the white balance adjustment is made by adjusting (more specifically by recalculating and updating) correction data in the LUT.

The LCD television 1 makes white balance adjustment by using a white balance adjustment image supply device 60 as an external device, a measuring device 70 and an adjustment remote control 80. The white balance adjustment image supply device 60 outputs white balance adjustment image data as image data of a white balance adjustment image to be used to make white balance adjustment (more specifically to recalculate correction data in an LUT). The measuring device 70 measures color balance of an image to be measured, and outputs a measured color balance value. The adjustment remote control 80 is operated by a person to make the adjustment, who commands various operations for making the white balance adjustment, so as to transmit operation signals indicating content of the operations by using a wireless signal.

The LCD television 1 comprises a tuner 2, an image processor 3, an LCD panel 4 as a color display unit, an audio processor 5, a speaker 6, a white balance adjustment image input unit 7, a measured value input unit 8, a remote control 9, a remote control receiver 10, a microcomputer 11 for controlling the operation of the LCD television 1, and so on. Under the control of the microcomputer 11, the tuner 2 receives a television signal broadcast from a television broadcast station, and generates image data of a color image based on the television signal and audio data of sound also based on the television signal. Under the control of the microcomputer 11, the image processor 3 subjects the image data generated by the tuner 2 to various image data processing, and supplies the processed image data to the LCD panel 4. The LCD panel 4 displays a color image based on the image data supplied from the image processor 3. Further, under the control of the microcomputer 11, the audio processor 5 subjects the audio data generated by the tuner 2 to various audio data processing, and supplies the processed audio data to the speaker 6. The speaker 6 outputs sound based on the audio data supplied from the audio processor 5.

The remote control 9 is operated by a user to command various operations of the LCD television 1 so as to transmit operation signals indicating the content of the operations by using infrared. The remote control receiver 10 receives the operation signals transmitted from the remote control 9, and also receives the operation signals transmitted from the adjustment remote control 80. The white balance adjustment image input unit 7 is used to make the white balance adjustment, and is connected to the white balance adjustment image supply device 60 so as to allow white balance adjustment image data output from the white balance adjustment image supply device 60 to be input to the white balance adjustment image input unit 7. The measured value input unit 8 is also used to make the white balance adjustment, and is connected to the measuring device 70 so as to allow the measured color balance value output from the measuring device 70 to be input to the measured value input unit 8. The microcomputer 11 controls various operations of the LCD television 1 including those described above.

Figure 2:
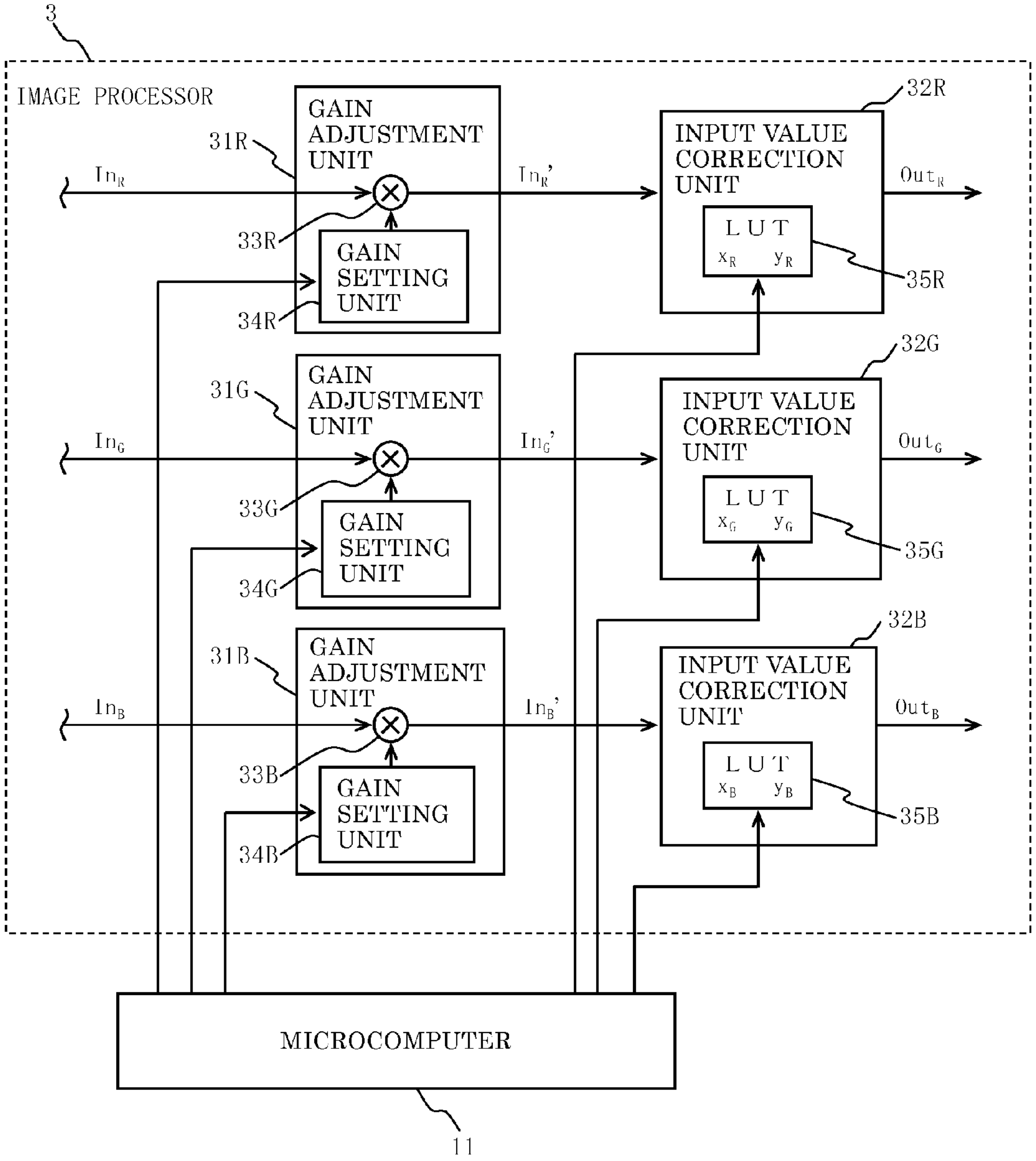
FIG. 2 is a schematic block diagram of an example of an image processor with a microcomputer in the LCD television.

FIG. 2 is a schematic block diagram of an example of the image processor 3 with the microcomputer 11 in the LCD television 1. The image processor 3 comprises gain adjustment units 31R, 31G, 31B and input value correction units 32R, 32G, 32B as well as various signal processing units (not shown). Input to the image processor 3 is image data of an image based on a television signal generated by the tuner 2, or image data of a white balance adjustment image input from the white balance adjustment image input unit 7. The image data input to the image processor 3 is subjected to various signal processing by the various signal processing units (not shown). Input signal values $In_R$, $In_G$, $In_B$ representing brightness levels of respective colors of red, green and blue in the input and processed image data are input to the gain adjustment units 31R, 31G 31B. The gain adjustment units 31R, 31G, 31B serve to provide gain to the input signal values $In_R$, $In_G$, $In_B$ representing brightness levels of respective colors of red, green and blue in the image data. The gain adjustment unit 31R comprises a multiplier circuit 33R and a gain setting unit 34R, and the gain adjustment unit 31G comprises a multiplier circuit 33G and a gain setting unit 34G, while the gain adjustment unit 31B comprises a multiplier circuit 33B and a gain setting unit 34B.

The multiplier circuit 33R of the gain adjustment unit 31R multiplies the input signal value $In_R$ representing the brightness level of red by a gain value set in the gain setting unit 34R so as to provide a gain to the input signal value $In_R$ (input signal value $In_R$ provided with a gain being hereafter referred to as gain-modified input signal value $In_R'$). The multiplier circuit 33G of the gain adjustment unit 31G multiplies the input signal value $In_G$ representing the brightness level of green by a gain value set in the gain setting unit 34G so as to provide a gain to the input signal value $In_G$ (input signal value $In_G$ provided with a gain being hereafter referred to as gain-modified input signal value $In_G'$). Similarly, the multiplier circuit 33B of the gain adjustment unit 31B multiplies the input signal value $In_B$ representing the brightness level of blue by a gain value set in the gain setting unit 34B so as to provide a gain to the input signal value $In_B$ (input signal value $In_B$ provided with a gain being hereafter referred to as gain-modified input signal value $In_B'$). The gain-modified input signal values $In_R'$, $In_G'$, $In_B'$ (i.e. the input signal values $In_R$, $In_G$, $In_B$ provided with the gain by the gain adjustment units 31R, 31G 31B that are output signal values of the gain adjustment units 31R, 31G, 31B) are respectively input to the input value correction units 32R, 32G 32B.

The input value correction units 32R, 32G 32B serve to correct color balance of a color image to be displayed on the LCD panel 4. The input value correction units 32R, 32G, 32B respectively comprise an LUT 35R, an LUT 35G and an LUT 35B. Each of the LUTs 35R, 35G, 35B is a table of correction data for correcting color balance of the color image to be displayed on the LCD panel 4. The correction data in the LUTs 35R, 35G 35B represent relationships between pre-correction values representing pre-correction brightness levels of the respective colors of red, green and blue and post-correction values representing brightness levels to be output after correcting the pre-correction values, respectively.

More specifically, the correction data in the LUT 35R represents a relationship between a pre-correction value $x_R$ representing a pre-correction brightness level of the red color and a post-correction value $y_R$ representing a brightness level of the red color to be output after correcting the pre-correction value $x_R$. The correction data in the LUT 35G represents a relationship between a pre-correction value $x_G$ representing a pre-correction brightness level of the green color and a post-correction value $y_G$ representing a brightness level of the green color to be output after correcting the pre-correction value $x_G$. Similarly, the correction data in the LUT 35B represents a relationship between a pre-correction value $x_B$ representing a pre-correction brightness level of the blue color and a post-correction value $y_B$ representing a brightness level of the blue color to be output after correcting the pre-correction value $x_B$.

The input value correction units 32R 32G 32B correct the gain-modified input signal values $In_R'$, $In_G'$, $In_B'$ based on the correction data in the LUTs 35R, 35G 35B, respectively. More specifically, the input value correction unit 32R uses the LUT 35R as a reference to output, as an output signal value $OUT_R$, a post-correction value $y_R$ which corresponds to a pre-correction value $x_R$ equal to the gain-modified input signal value $In_R'$. The input value correction unit 32G uses the LUT 35G as a reference to output, as an output signal value $OUT_G$, a post-correction value $y_G$ which corresponds to a pre-correction value $x_G$ equal to the gain-modified input signal value $In_G'$. Similarly, the input value correction unit 32B uses the LUT 35B as a reference to output, as an output signal value $OUT_B$, a post-correction value $y_B$ which corresponds to a pre-correction value $x_B$ equal to the gain-modified input signal value $In_B'$. The output values $OUT_R$, $OUT_G$, $OUT_B$ output from the input value correction units 32R 32G, 32B (i.e. input signal values after corrected by the input value correction units 32R 32G, 32B) are supplied to the LCD panel 4 so that an image based on the output signal values $OUT_R$, $OUT_G$, $OUT_B$ is displayed on the LCD panel 4.

According to LCD television 1 of the present embodiment using the thus formed image processor 3, when an image based on given image data (more specifically, an image based on a television signal or a white balance adjustment image) is displayed on the LCD panel 4, the gain adjustment units 31R, 31B, 31G provide gain to the input signal values $In_R$, $In_G$, $In_B$ representing brightness levels of respective colors of red, green and blue in the image data of such image. The gain-modified input signal values $In_R'$, $In_G'$, $In_B'$ (input signal values $In_R$, $In_G$, $In_B$ provided with the gain) are corrected based on the correction data in the LUTs 35R, 35G, 35B, and an image based on the thus corrected input signal values (i.e. the output signal values $OUT_R$, $OUT_G$, $OUT_B$) is displayed on the LCD panel 4.

The gain values of the gain setting units 34R, 34G, 34B are set under the control of the microcomputer 11. More specifically, the microcomputer 11 controls adjustment of the gain value provided by the gain adjustment unit 31R to the input signal value $In_R$, and adjustment of the gain value provided by the gain adjustment unit 31G to the input signal value $In_G$ as well as adjustment of the gain value provided by the gain adjustment unit 31B to the input signal value $In_B$. Other than when displaying a white balance adjustment image, the microcomputer 11 sets the gain value of each of the gain setting units 34R, 34G, 34B to 1 (one). In other words, when displaying images (based on a television signal) other than a white balance adjustment image, the input signal values $In_R$, $In_G$, $In_B$ before provided with the gain are equal to the gain-modified input signal values $In_R'$, $In_G'$, $In_B'$ (input signal values $In_R$, $In_G$, $In_B$ provided with the gain), respectively.

Figure 3:
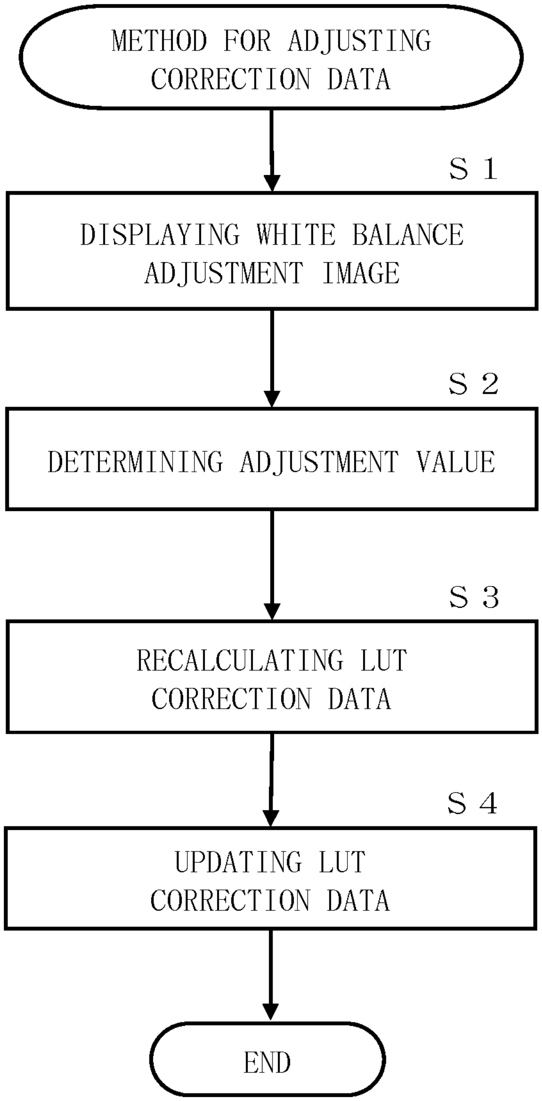
FIG. 3 is a flow chart showing a method for adjusting correction data in LUTs in the image processor.

Next, the white balance adjustment will be described. According to the present embodiment, the white balance adjustment is made by adjusting (more specifically by recalculating and updating) correction data in the LUTs 35R, 35G 35B. FIG. 3 is a flow chart showing a method for adjusting correction data in the LUTs 35R, 35G, 35B. Referring to FIG. 3, the method for adjusting correction data in the LUTs 35R, 35G, 35B comprises the steps of: displaying a white balance adjustment image (S1) to display a predetermined white balance adjustment image (white color or neutral color image with a predetermined brightness level) on the LCD display 4; determining an adjustment value (S2) to determine, as an adjustment gain value (adjustment value), a gain value of each of the gain adjustment units 31R, 31G, 31B which value brings the color balance of the white balance adjustment image displayed on the LCD panel 4 to a predetermined color balance; recalculating an LUT correction data (S3) to recalculate the correction data in the LUTs 35R, 35G, 35B based on the correction data and the adjustment gain value; and updating an LUT correction data (S4) to update the correction data in the LUTs 35R, 35G 35B to the recalculated correction data.

The method for adjusting correction data according to the present embodiment allows two white balance adjustment images with different brightness levels to be displayed as the white balance adjustment image on the LCD panel 4, and determines adjustment gain values for the two different white balance adjustment images, and further recalculates correction data in the LUTs 35R, 35G 35B based on the correction data and the adjustment gain values for the two different white balance adjustment images with different brightness levels. Thereafter, the correction data in the LUTs 35R, 35G, 35B are updated to the recalculated correction data. In the following, one of the two white balance adjustment images with a lower brightness level and the other of the two white balance adjustment images with a higher brightness level will be respectively referred to as Low side white balance adjustment image and High side white balance adjustment image. Further, adjustment input values (input values used for adjustment) for red, green and blue color in the image data of the Low side white balance adjustment image will be respectively referred to as Low side adjustment input values $InL_R$, $InL_G$, $InL_B$, while adjustment input values for red, green and blue color in the image data of the High side white balance adjustment image will be respectively referred to as High side adjustment input values $InH_R$, $InH_G$, $InH_B$.

Further, adjustment gain values for red, green and blue color which bring the color balance of the Low side white balance adjustment image displayed on the LCD panel 4 to a predetermined color balance will be respectively referred to as Low side adjustment gain values $GainL_R$, $GainL_G$, $GainL_B$, while adjustment gain values for red, green and blue color which bring the color balance of the High side white balance adjustment image displayed on the LCD panel 4 to a predetermined color balance will be respectively referred to as High side adjustment gain values $GainH_R$, $GainH_G$, $GainH_B$. Further, the quotient of $(x_R-GainL_R)/(GainH_R-GainL_R)$ will be denoted by $\alpha_R$, and the quotient of $(x_G-GainL_G)/(GainH_G-GainL_G)$ will be denoted by $\alpha_G$, while the quotient of $(x_B-GainL_B)/(GainH_B-GainL_B)$ will be denoted by $\alpha_B$. Here, $x_R$, $x_G$, $x_B$ respectively denote pre-correction values representing pre-correction brightness levels of red, green and blue color in the LUTs 35R, 35G, 35B. On the other hand, post-correction values (representing post-correction brightness levels of red, green and blue output after correcting $x_R$, $x_G$, $x_B$) in the LUTs 35R, 35G, 35B, before recalculation, will be respectively denoted by $y_R=F_R(x_R)$, $y_G=F_G(x_G)$, $y_B=F_B(x_B)$, while post-correction values (representing post-correction brightness levels of red, green and blue output after correcting $x_R$, $x_G$, $x_B$) in the LUTs 35R, 35G, 35B, after recalculation, will be respectively denoted by $y_R=G_R(x_R)$, $y_G=G_G(x_G)$, $y_B=G_B(x_B)$.

The operation of the microcomputer 11 is as follows. For red color, the microcomputer 11 recalculates the post-correction value $y_R=G_R(x_R)$ in the LUT 35R as:

$$y_R=G_R(x_R)-F_R(\mathrm{Gain}L_R\times x_R) \text{ in the range of } x_{R\leq InLR};$$

$$y_R=G_R(x_R)-\alpha_R\times F_R(\mathrm{Gain}H_R\times x_R)+(1-\alpha_R)\times F_R(\mathrm{Gain}L_R\times x_R) \text{ in the range of } InL_R<x_R<InH_R; \text{ and}$$

$$y_R=G_R(x_R)=F_R(\mathrm{Gain}H_R\times x_R) \text{ in the range of } InH_R\leq x_R.$$

Then, the microcomputer 11 updates the correction data in the LUT 35R to the recalculated correction data. In a similar manner, the microcomputer 11 recalculates the post-correction value $y_G=G_G(x_G)$ in the LUT 35G for green color and the post-correction value $y_B=G_B(x_B)$ in the LUT 35B for blue color, and then updates the correction data in the LUT 35G and LUT 35B to the recalculated correction data, respectively.

The microcomputer 11 forms LUT correction data recalculating means and LUT correction data updating means according to the present invention, i.e. LUT correction data recalculating means for recalculating the correction data based on the correction data stored in each LUT, and LUT correction data updating means for updating the correction data stored in each LUT to the correction data recalculated by the LUT correction data recalculating means. Further, the microcomputer 11 and the gain adjustment units 31R, 31G, 31B form gain adjusting means according to the present invention, i.e. gain adjusting means for providing gain to an adjustment input value which is an input signal value representing a brightness level of each color of red, green and blue in image data of a white balance adjustment image to be used for recalculating the correction data in each LUT.

Adjustment of the correction data in the LUTs 35R, 35G, 35B is made as follows. First, a person (hereafter referred to as operator) to make the adjustment connects the white balance adjustment image supply device 60 to the white balance adjustment image input unit 7, and also connects the measuring device 70 to the measured value input unit 8. Subsequently, the operator operates to output image data of a Low side white balance adjustment image from the white balance adjustment image supply device 60. Thereby, the image data of the Low side white balance adjustment image is input from the white balance adjustment image input unit 7, and gain is provided by the gain adjustment units 31R, 31G, 31B to the Low side adjustment input values $InL_R$, $InL_G$, $InL_B$, which are input signal values $In_R$, $In_G$, $In_B$ representing brightness levels of respective colors of red, green and blue in the image data of the Low side white balance adjustment image (Low side adjustment input values $InL_R$, $InL_G$, $InL_B$ each provided with a gain being hereafter referred to as gain-modified Low side adjustment input values $InL_R'$ $InL_G'$, $InL_B$, respectively). The gain-modified Low side adjustment input values $InL_R'$ $InL_G'$, $InL_B'$ are corrected based on the correction data in the LUTs 35R, 35G, 35B, and a Low side white balance adjustment image based on the thus corrected gain-modified Low side adjustment input values is displayed on the LCD panel 4 (S1: Displaying White Balance Adjustment Image). The Low side adjustment input values $InL_R$, $InL_G$, $InL_B$ are e.g. designed to be 33 percent of the maximum possible values of the input signal values $In_R$, $In_G$, $In_B$, respectively.

The operator then uses the measuring device 70 to measure color balance of the Low side white balance adjustment image displayed on the LCD panel 4. The measured color balance value of the Low side white balance adjustment image measured by the measuring device 70 is input to the measured value input unit 8. Further, the operator operates the adjustment remote control 80 to command to determine Low side adjustment gain values $GainL_R$, $GainL_G$, $GainL_B$. In response, based on the measured color balance value input from the measured value input unit 8, the microcomputer 11 adjusts the gain values of the gain adjustment units 31R, 31G, 31B (i.e. gain values to be provided to the Low side adjustment input values $InL_R$, $InL_G$, $InL_B$) so as to allow the measured color balance value to be in a predetermined range, i.e. bring the color balance of the Low side white balance adjustment image displayed on the LCD panel 4 to a predetermined color balance.

The color balance of the Low side white balance adjustment image displayed on the LCD panel 4 varies with the adjustment of the gain value of each of the gain adjustment units 31R, 31G 31B, and in turn, the measured color balance value input to the measured value input unit 8 varies with the color balance of the Low side white balance adjustment image displayed on the LCD panel 4. The gain values to allow the measured color balance value to be in a predetermined range, i.e. the gain values to bring the color balance of the Low side white balance adjustment image displayed on the LCD panel 4 to a predetermined color balance, are determined by the microcomputer 11 as the Low side adjustment gain values $GainL_R$, $GainL_G$, $GainL_B$ (S2: Determining Adjustment Value).

Subsequently, the operator operates to output image data of a High side white balance adjustment image from the white balance adjustment image supply device 60. Thereby, the image data of the High side white balance adjustment image is input from the white balance adjustment image input unit 7, and gain is provided by the gain adjustment units 31R, 31G, 31B to the High side adjustment input values $InH_R$, $InH_G$, $InH_B$, which are input signal values $In_R$, $In_G$, $In_B$ representing brightness levels of respective colors of red, green and blue in the image data of the High side white balance adjustment image (High side adjustment input values $InH_R$, $InH_G$, $InH_B$ each provided with a gain being hereafter referred to as gain-modified High side adjustment input values $InH_R'$ $InH_G'$, $InH_B$, respectively). The gain-modified High side adjustment input values $InH_R'$ $InH_G'$, $InH_B'$ are corrected based on the correction data in the LUTs 35R, 35G 35B, and a High side white balance adjustment image based on the thus corrected gain-modified High side adjustment input values is displayed on the LCD panel 4 (S1: Displaying White Balance Adjustment Image). The High side adjustment input values $InH_R$, $InH_G$, $InH_B$ are, for example, designed to be 66 percent of the maximum possible values of the input signal values $In_R$, $In_G$, $In_B$, respectively.

The operator then uses the measuring device 70 to measure color balance of the High side white balance adjustment image displayed on the LCD panel 4. The measured color balance value of the High side white balance adjustment image measured by the measuring device 70 is input to the measured value input unit 8. Further, the operator operates the adjustment remote control 80 to command to determine High side adjustment gain values $GainH_R$, $GainH_G$, $GainH_B$. Thus, similarly as in the case of Low side white balance adjustment, the gain values to allow the measured color balance value to be in a predetermined range, i.e. the gain values to bring the color balance of the High side white balance adjustment image displayed on the LCD panel 4 to a predetermined color balance, are determined by the microcomputer 11 as the High side adjustment gain values $GainH_R$, $GainH_G$, $GainH_B$ (S2: Determining Adjustment Value).

Further, the operator operates the adjustment remote control 80 to command to adjust correction data in the LUTs 35R, 35G, 35B. In response, the microcomputer 11 recalculates the correction data in the LUTs 35R, 35G 35B based on the correction data, the Low side adjustment gain values $GainL_R$, $GainL_G$, $GainL_B$ and the High side adjustment gain values $GainH_R$, $GainH_G$, $GainH_B$ (S3: Recalculating LUT Correction Data), and updates the correction data to the recalculated correction data (S4: Updating LUT Correction Data). Thereafter, the microcomputer 11 sets the gain value of each of the gain setting units 34R, 34G, 34B to 1 (one). The adjustment of the correction data in the LUTs 35R, 35G, 35B (i.e. white balance adjustment) is made in this way.

Figure 4:
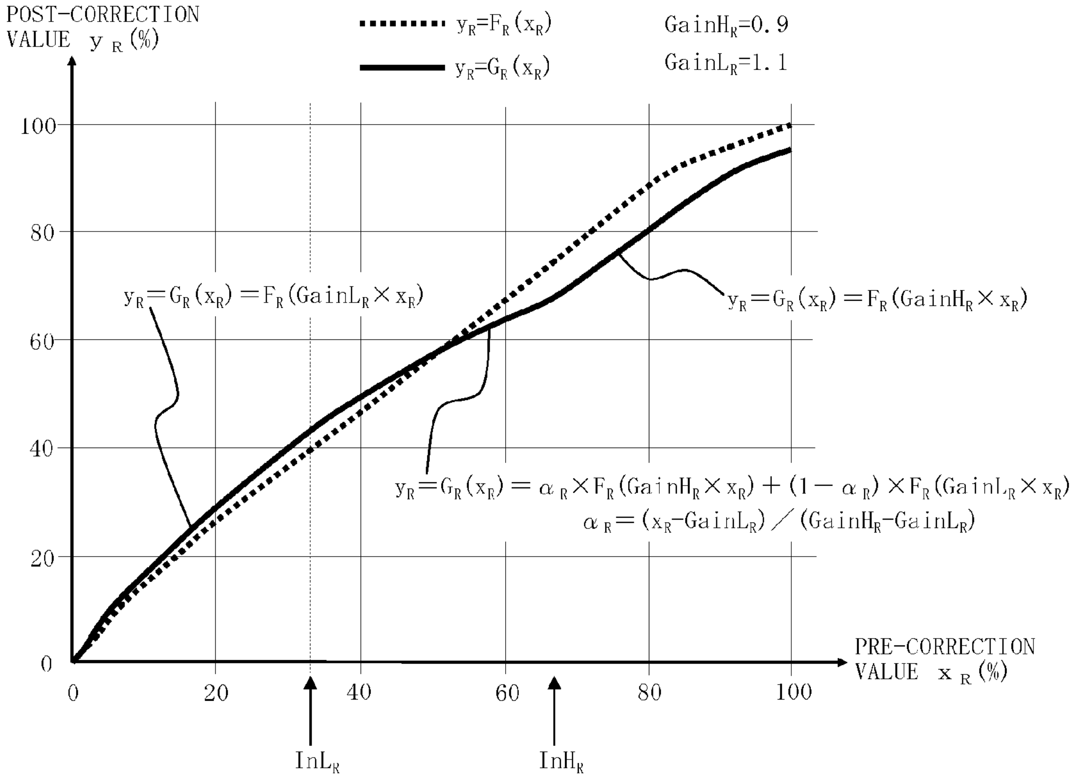
FIG. 4 is a graph showing an example of correction data in an LUT.

FIG. 4 is a graph showing an example of correction data in the LUT 35R, in which the horizontal axis represents pre-correction values $x_R$ representing pre-correction brightness levels of red color, and the vertical axis represents post-correction values $y_R$ representing brightness levels of the red color to be output after correcting the pre-correction values $x_R$. In FIG. 4, the curve $y_R=F_R(x_R)$ shows post-correction values before recalculation, while the curve $y_R=G_R(x_R)$ shows post-correction values after recalculation. The graph shows the correction data assuming that the minimum and maximum values of brightness level are 0 and 100, respectively. In the graph, the curve $y_R=G_R(x_R)$ shown was obtained by recalculating the curve $y_R=F_R(x_R)$ shown, in which the white balance adjustment was made by setting the Low side adjustment input value $InL_R$ to 33 percent of the maximum possible value of the input signal value $In_R$, and by setting the High side adjustment input value $InH_R$ to 66 percent of the maximum possible value of the input signal value $In_R$, while the adjustment gain values were, respectively, Low side adjustment gain value $GainL_R=1.1$ and the High side adjustment gain value $GainH_R=0.9$.

As described above, according to the embodiment of the present invention, it is possible to update correction data in the LUTs 35R, 35G, 35B for respective input signal values representing brightness levels of respective colors of red, green and blue in image data of an image to be displayed so as to correct the respective input signal values. Thus, it is possible to correct the input signal values based on the correction data in the LUTs 35R, 35G, 35B, respectively, over the entire range of the input signal values representing brightness levels of the respective colors of red, green and blue in the image data of the image to be displayed. This makes it possible to increase color accuracy of the displayed image (i.e. to bring the color balance of the displayed image to a predetermined color balance) after the white balance adjustment is made, thereby increasing accuracy of the white balance adjustment.

Furthermore, according to the present embodiment, the white balance adjustment is made by recalculating and updating correction data in the LUTs 35R, 35G, 35B, in which the recalculation and updating of the correction data in the LUTs 35R, 35G, 35B can be performed in a short time, thereby making it possible to reduce time required for white balance adjustment. In addition, it is only required to change software in a conventional image display device without need to change the hardware structure of the image display device. Thus, it is possible to achieve the increase in the accuracy of white balance adjustment and reduce the time required for the white balance adjustment without increasing the cost of the image display device.

Figure 5:
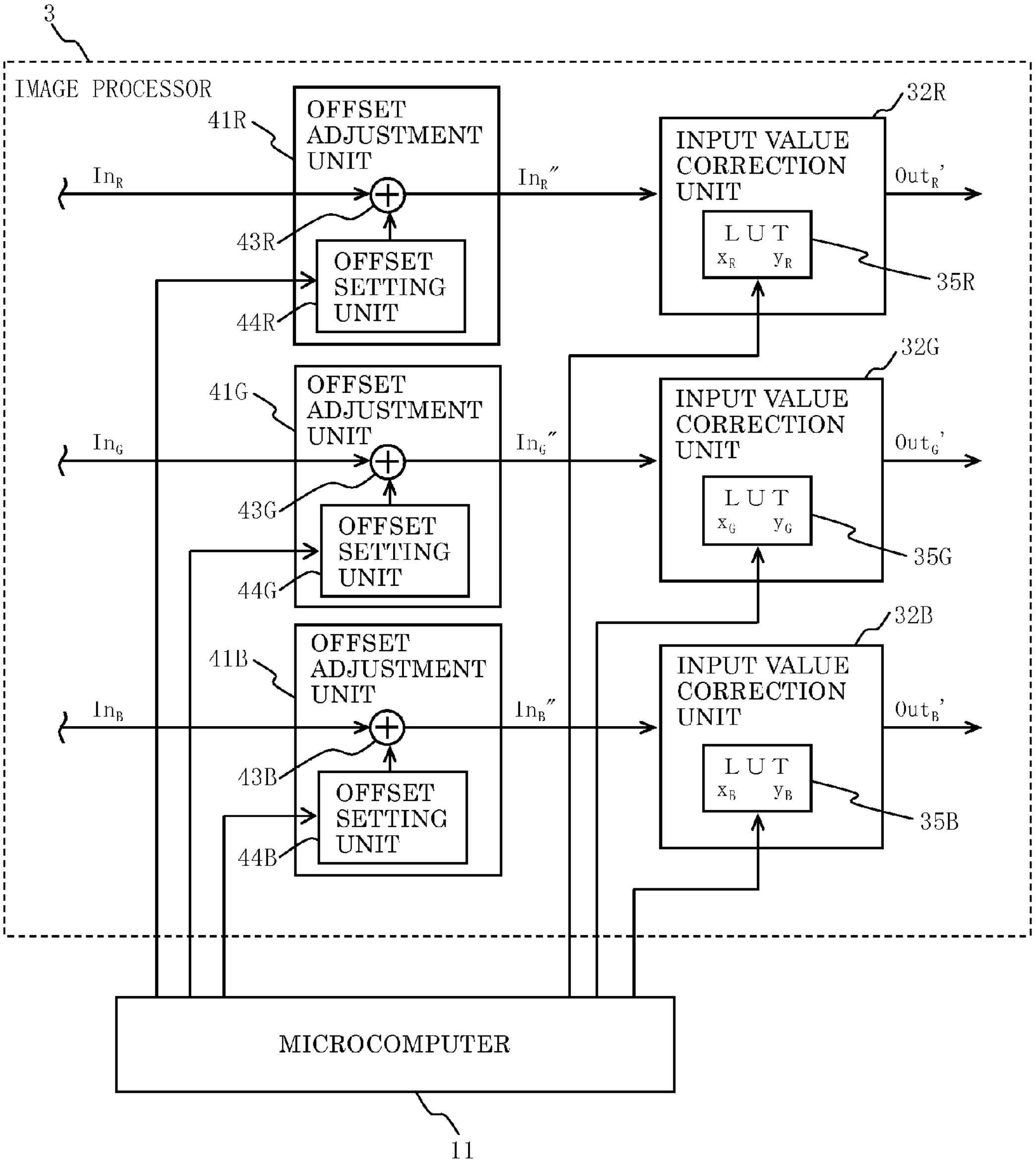
FIG. 5 is a schematic block diagram of a modified example of the image processor with the microcomputer in the LCD television.

It is to be noted that the present invention is not limited to the above embodiment, and various modifications are possible within the spirit and scope of the present invention. For example, the signal processor 3 can be modified as follows. FIG. 5 is a schematic block diagram of a modified example of the image processor 3 with the microcomputer 11 in the LCD television 1. As shown in FIG. 5, the gain adjustment units 31R, 31G 31B in the signal processor 3 shown in FIG. 2 can be replaced by offset adjustment units 41R, 41G, 41B which serve to provide offset to the input signal values $In_R$, $In_G$, $In_B$ representing brightness levels of respective colors of red, green and blue in the image data, or provide offset to the adjustment input values. The microcomputer 11 and the offset adjustment units 41R, 41G, 41B form offset adjusting means according to the present invention, i.e. offset adjusting means for providing offset to an adjustment input value which is an input signal value representing a brightness level of each color of red, green and blue in image data of a white balance adjustment image to be used for recalculating the correction data in each LUT.

The offset adjustment unit 41R comprises an adder circuit 43R and an offset setting unit 44R, and the offset adjustment unit 41G comprises an adder circuit 43G and an offset setting unit 34G while the offset adjustment unit 41B comprises an adder circuit 43B and an offset setting unit 44B. According to this modified example using the thus formed image processor 3, when an image based on given image data (more specifically, an image based on a television signal or a white balance adjustment image) is displayed on the LCD panel 4, the offset adjustment units 41R, 41B, 41G provide offset to the input signal values $In_R$, $In_G$, $In_B$ representing brightness levels of respective colors of red, green and blue in the image data of such image, or provide offset to the adjustment input values for white balance adjustment, as follows.

The adder circuit 43R of the offset adjustment unit 41R provides an offset to the input signal value $In_R$ representing the brightness level of red by adding an offset value set in the offset setting unit 44R to the input signal value $In_R$ (input signal value $In_R$ provided with an offset being hereafter referred to as offset-modified input signal value $In_R$") or to the adjustment input value for red. The adder circuit 43G of the offset adjustment unit 41G provides an offset to the input signal value $In_G$ representing the brightness level of green by adding an offset value set in the offset setting unit 44G to the input signal value $In_G$ (input signal value $In_G$ provided with an offset being hereafter referred to as offset-modified input signal value $In_G$") or to the adjustment input value for green. Similarly, the adder circuit 43B of the offset adjustment unit 41B provides an offset to the input signal value $In_B$ representing the brightness level of blue by adding an offset value set in the offset setting unit 44B to the input signal value $In_B$ (input signal value $In_B$ provided with an offset being hereafter referred to as offset-modified input signal value $In_B''$) or to the adjustment input value for blue.

The offset-modified input signal values $In_R''$, $In_G''$, $In_B''$ (i.e. the input signal values $In_R$, $In_G$, $In_B$ provided with the offset by the offset adjustment units 41R, 41G, 41B that are output signal values of the offset adjustment units 41R, 41G, 41B) are respectively input to the input value correction units 32R, 32G, 32B, or the offset-modified adjustment input values are respectively input to the input value correction units 32R, 32G, 32B. The offset-modified input signal values $In_R''$, $In_G''$, $In_B''$ or the offset-modified adjustment input values are then corrected based on correction data in the LUTs 35R, 35G, 35B, and an image based on the corrected input signal values (i.e. output signal values $OUT_R'$, $OUT_G'$, $OUT_B'$) or a white balance adjustment image based on the corrected offset-modified adjustment input values is displayed on the LCD panel 4.

Similarly as in the above embodiment, the microcomputer 11 in this modified example is designed to perform the steps of: determining an adjustment value to determine, as an adjustment offset value (adjustment value), an offset value of each of the offset adjustment units 41R, 41G, 41B which value brings the color balance of the white balance adjustment image displayed on the LCD panel 4 to a predetermined color balance; recalculating an LUT correction data to recalculate the correction data in the LUTs 35R, 35G, 35B based on the correction data and the adjustment offset value; and updating an LUT correction data to update the correction data in the LUTs 35R, 35G, 35B to the recalculated correction data.

In addition, an adjustment image according to the present invention is not limited to the one in the above embodiment, and can be another one. More specifically, although the adjustment image in the above embodiment comprises two adjustment images (Low and High), it can be a single adjustment image or three adjustment images so as to allow recalculation of correction data in the LUTs by using the single adjustment image or three adjustment images. Further, the color display unit to be used for displaying an image is not limited to an LCD panel, and may be a plasma display panel, a CRT display panel, an organic EL display panel, or the like. Similar functions and effects to those obtained by the LCD panel can be obtained by the plasma display panel, the CRT display panel, the organic EL display panel, or the like, making it possible to increase accuracy of white balance adjustment. Furthermore, the present invention can be applied not only to an LCD television, but to other image display devices including: an image display device to be connected to an AV (Audio Video) device such as a BD (Blue-Ray Disc) player; an image display device to be used for a personal computer; and an image display device of a video camera type to capture images and display the captured images on a color display.

The present invention has been described above using presently preferred embodiments, but such description should not be interpreted as limiting the present invention. Various modifications will become obvious, evident or apparent to those ordinarily skilled in the art, who have read the description. Accordingly, the appended claims should be interpreted to cover all modifications and alterations which fall within the spirit and scope of the present invention.

This application is based on Japanese patent application 2011-013348 filed Jan. 25, 2011, the content of which is hereby incorporated by reference.

The invention claimed is:

1. An image display device comprising:

a color display unit for displaying a color image; and a look-up table (LUT) which stores correction data for correcting color balance of the color image to be displayed on the color display unit, wherein when a color image based on input image data is displayed on the color display unit, an input signal value representing a brightness level of each color of red, green and blue in the input image data is corrected based on the correction data in the LUT so as to display a color image based on the corrected input signal value on the color display unit, and wherein the image display device further comprises:

LUT correction data recalculating means for recalculating the correction data in the LUT based on the correction data;

LUT correction data updating means for updating the correction data in the LUT to the correction data recalculated by the LUT correction data recalculating means; and gain adjusting means for providing gain to an adjustment input value which is an input signal value representing a brightness level of each color of red, green and blue in image data of a white balance adjustment image to be used for recalculating the correction data in the LUT, wherein when the adjustment image is displayed on the color display unit, the gain adjusting means provides a gain to the adjustment input value to generate a gain-modified adjustment input value, and the gain-modified adjustment input value is then corrected based on the correction data in the LUT so as to display a white balance adjustment image based on the corrected gain-modified input value, wherein a gain value, which is provided to the adjustment input value by the gain adjusting means and which brings color balance of the white balance adjustment image displayed on the color display unit to a predetermined color balance, is determined as an adjustment gain value, wherein the white balance adjustment image comprises a plurality of different white balance adjustment images, wherein the LUT correction data recalculating means recalculates the correction data in the LUT based on the correction data and the adjustment gain values for the plurality of white balance adjustment images, wherein the correction data in the LUT represents a relationship between a pre-correction value representing a pre-correction brightness level of each color of red, green and blue and a post-correction value representing a brightness level to be output after correcting the pre-correction value, wherein the number of the plurality of white balance adjustment images is two, wherein assuming that x denotes the pre-correction value, y=F(x) denotes the post-correction value before recalculation by the LUT correction data recalculating means, and further y=G(x) denotes the post-correction value after recalculation by the LUT correction data recalculating means, the LUT correction data recalculating means recalculates the post-correction value y=G (x) in the LUT as:

$$y=G(x)=F(\mathrm{Gain}L\times x) \text{ in the range of } x\le InL;$$

$$y=G(x)=\alpha\times F(\mathrm{Gain}H\times x)+(1-\alpha)\times F(\mathrm{Gain}L\times x) \text{ in the range of } InL<x<InH; \text{ and}$$

$$y=G(x)=F(\mathrm{Gain}H\times x) \text{ in the range of } InH\le x$$

where InL denotes the adjustment input value in image data of a Low side white balance adjustment image which is one of the two white balance adjustment images with a lower brightness level while InH denotes the adjustment input value in image data of a High side white balance adjustment image which is the other of the two white balance adjustment images with a higher brightness level, and where GainL denotes the adjustment gain value which brings color balance of the Low side white balance adjustment image to a predetermined color balance while GainH denotes the adjustment gain value which brings color balance of the High side white balance adjustment image to a predetermined color balance, and further where a denotes the quotient of (x−GainL)/(GainH−GainL).

2. A method for adjusting correction data in a look-up table (LUT) which stores correction data for correcting color balance of a color image to be displayed on a color display unit, in which the correction data in the LUT represents a relationship between a pre-correction value representing a pre-correction brightness level of each color of red, green and blue and a post-correction value representing a brightness level to be output after correcting the pre-correction value, the method comprising the steps of:

displaying, on the color display unit, a white balance adjustment image to be used for adjusting the correction data in the LUT after using the correction data in the LUT to correct an adjustment input value which is an input signal value representing a brightness level of each color of red, green and blue, in image data of the white balance adjustment image;

determining, as an adjustment gain value, a gain value to bring color balance of the white balance adjustment image displayed on the color display unit to a predetermined color balance after providing a gain to the adjustment input value and adjusting the gain so as to bring the color balance of the displayed white balance adjustment image to the predetermined color balance;

recalculating the correction data in the LUT based on the correction data and the adjustment gain value; and updating the correction data in the LUT to the recalculated correction data, wherein the white balance adjustment image comprises two white balance adjustment images, and assuming that x denotes the pre-correction value, y=F(x) denotes the post-correction value before recalculation in the recalculating step, and further v=G(x) denotes the post-correction value after recalculation in the recalculating step, the post-correction value y=G(x) in the LUT is recalculated in the recalculating step as:

$$y=G(x)=F(\mathrm{Gain}L\times x)\text{ in the range of }x\leq InL;$$

$$y=G(x)=\alpha\times F(\mathrm{Gain}H\times x)+(1-\alpha)\times F(\mathrm{Gain}L\times x)\text{ in the range of }InL<x<InH;\text{ and}$$

$$y=G(x)=F(\mathrm{Gain}H\times x)\text{ in the range of }InH\leq x$$

where InL denotes the adjustment input value in image data of a Low side white balance adjustment image which is one of the two white balance adjustment images with a lower brightness level while InH denotes the adjustment input value in image data of a High side white balance adjustment image which is the other of the two white balance adjustment images with a higher brightness level, and where GainL denotes the adjustment gain value which brings color balance of the Low side white balance adjustment image to a predetermined color balance while GainH denotes the adjustment gain value which brings color balance of the High side white balance adjustment image to a predetermined color balance, and further where a denotes the quotient of (x−GainL)/(GainH−GainL).

* * * * *